United States Patent
Wagner

[11] 3,710,886
[45] Jan. 16, 1973

[54] MECHANISM FOR CONVERTING WHEELED VEHICLE INTO TRACKED VEHICLE

[76] Inventor: Andrew F. Wagner, 288 Buchanan Field Road, Concord, Calif. 94520

[22] Filed: June 12, 1969

[21] Appl. No.: 838,369

[52] U.S. Cl. ................................180/9.2 R, 305/32
[51] Int. Cl. .............................................B62d 55/08
[58] Field of Search........180/6.7, 9.2 CD, 9.2 R, 9.5; 305/35 EB

[56] References Cited

UNITED STATES PATENTS

| | | | |
|---|---|---|---|
| 1,320,562 | 11/1919 | Martin | 180/9.2 CD |
| 1,443,871 | 1/1923 | Davis | 180/9.2 R |
| 2,852,317 | 9/1958 | Riemerschmid | 180/9.2 C |
| 2,698,667 | 1/1955 | Kropp | 180/9.2 C |
| 3,183,987 | 5/1965 | Trombley | 180/6.7 X |
| 3,361,221 | 1/1968 | Tyler | 180/9.5 |
| 2,992,862 | 7/1961 | Fredricks | 305/35 EB |

*Primary Examiner*—Richard L. Johnson
*Attorney*—Harris Zimmerman

[57] ABSTRACT

Mechanism for converting an automotive vehicle having tire-equipped wheels into a tracked vehicle. The conversion mechanism includes a pair of track assemblies respectively adapted to be connected along opposite sides of the vehicle to the front and rear brake drums thereat to replace the wheels of the vehicle with endless ground-traversing tracks. The mechanism further includes a steering system utilizing the brake apparatuses respectively associated with the brake drums and used in conjunction with the brake system of the vehicle to steer the same upon conversion thereof to a tracked vehicle.

7 Claims, 5 Drawing Figures

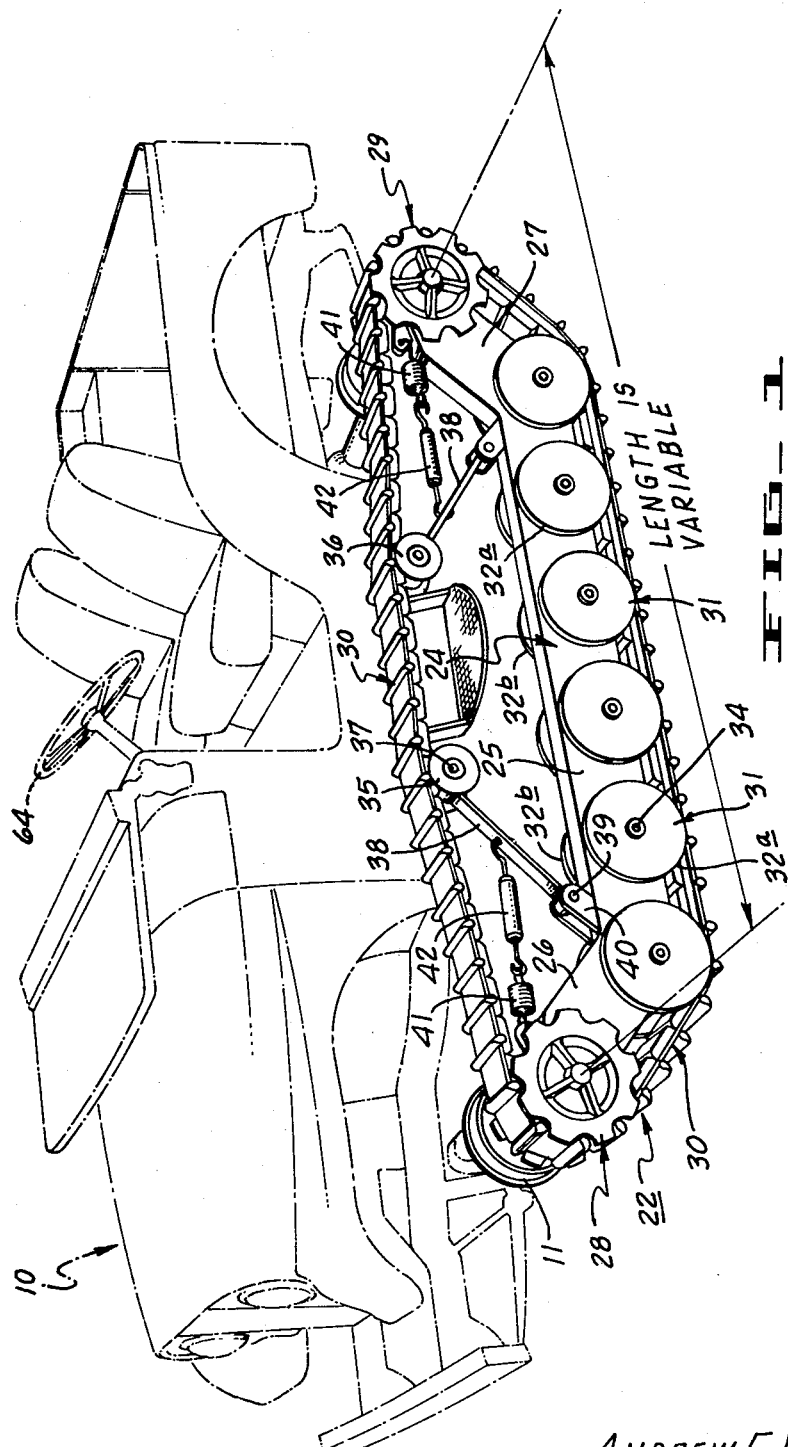

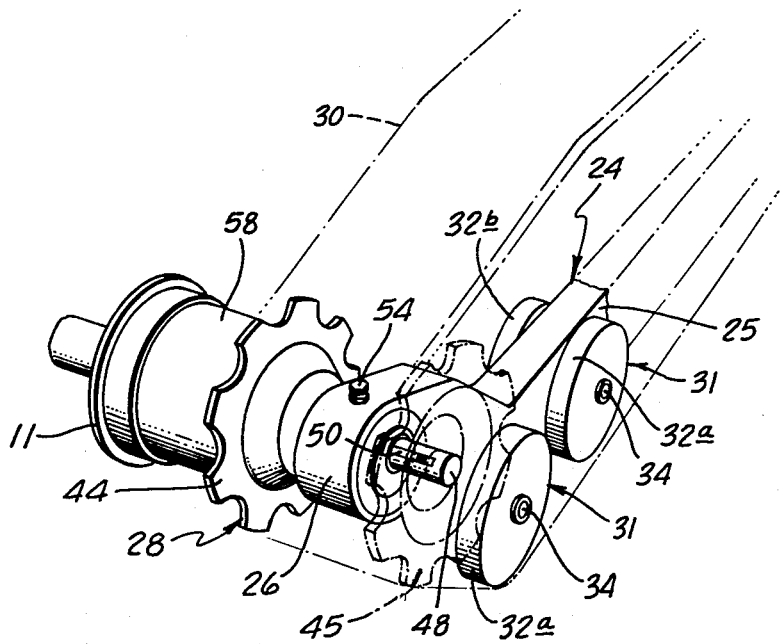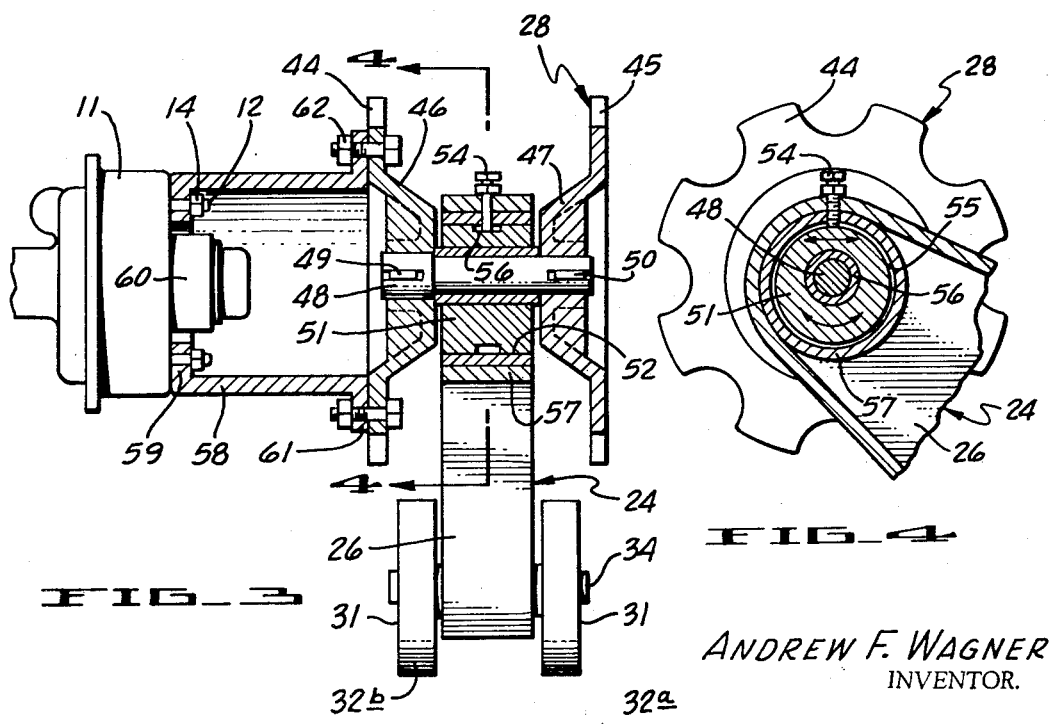

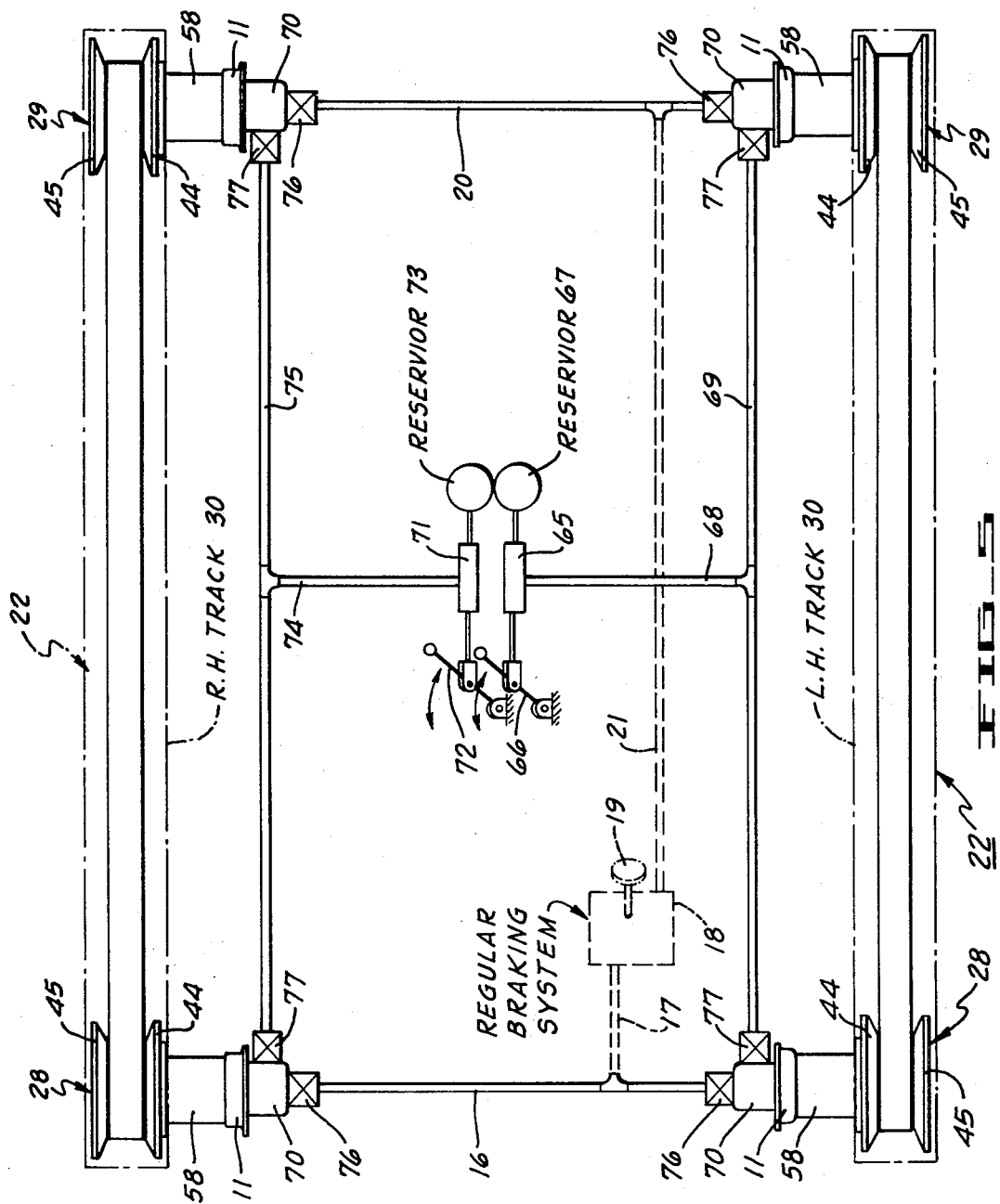

MECHANISM FOR CONVERTING WHEELED VEHICLE INTO TRACKED VEHICLE

This invention relates in general to wheel-equipped automotive vehicles and, more particularly, to mechanism for interchangeably converting such a vehicle into one equipped with endless ground-traversing tracks.

Automotive vehicles that have experienced considerable popularity in recent years are general purpose or utility vehicles that are intended primarily for use on paved and other prepared roadways, but which have sufficient power and maneuverability to permit them to be used to some extent over unprepared terrain. One such vehicle is known as the "Jeep" and is available with a standard two-wheel drive or with a four-wheel drive where the purchaser desires more maneuverability. Although vehicles of this type generally perform quite excellently, there are, most certainly, limitations concerning the type of terrain with which they may be used because the traction of such vehicles is limited to the restricted areas defined by the engagement of the driven tire-equipped wheels with the surface being traversed by the vehicle.

In many instances it would be desirable to have means available for increasing the traction of such vehicles, and therefore the general utility thereof, so as to enable the same to traverse terrain that otherwise might be impassable, and an object of the present invention is to provide such means. Another object of the invention is in the provision of an improved means for converting a wheel-equipped vehicle into a tracked vehicle to significantly increase the traction thereof whenever this is desired.

Still another object is that of providing improved mechanism for interchangeably converting a wheel-equipped vehicle into a tracked vehicle quickly and easily and for returning such vehicle to its wheel-equipped state with the same facility. A further object is to provide conversion mechanism of the character described that includes a pair of track assemblies respectively adapted to be connected to such vehicle along the opposite sides thereof to the front and rear brake drums thereof, and that further includes control means used in conjunction with the brake system of such vehicle for steering the same upon conversion thereof to a tracked vehicle.

Still a further object is in the provision of mechanism as described that is connectable with the front and rear brake drums of a vehicle on each side thereof, and that is provided with adjustment means accommodating variation in the distance between the front and rear brake drums and axes of rotation thereof from vehicle to vehicle and that also includes means for accommodating differences in the effective lengths of the endless treads associated with the front and rear brake drums on each side of the vehicle occasioned by any differences in such spacing therebetween. Yet a further object is that of providing an arrangement of the character described, in which the steering system for the tracked and braking system for the wheeled vehicle are interconnected and are interchangeably usable automatically and without adjustment for steering upon conversion to a tracked vehicle and for braking particularly when such vehicle is in the wheel-equipped mode thereof.

Additional objects and advantages of the invention, particularly as concerns specific features and details thereof, will become apparent as the specification develops.

An embodiment of the invention is illustrated in the accompanying drawings, in which:

FIG. 1 is a perspective view of a conversion unit shown in association with an automotive vehicle which is depicted by broken lines;

FIG. 2 is a broken perspective view of an end portion of such conversion unit with the endless track thereof depicted by broken lines for clarity;

FIG. 3 is a transverse sectional view taken through one of the drive sprockets;

FIG. 4 is a vertical sectional view taken along the line 4—4 of FIG. 3; and

FIG. 5 is essentially a schematic diagram illustrating the control mechanism for steering a tracked vehicle in association with the conventional braking system thereof.

Conversion units embodying the present invention have utility with a great variety of wheel-equipped vehicles to replace the wheels thereof with endless tracks. Such conversion of a wheeled vehicle effectively changes the same into a tractor-type vehicle having considerable traction, thereby enabling it to traverse terrain otherwise impassable. The conversion unit has utility with wheel-equipped vehicles irrespective of whether they have two-wheel or four-wheel drives, and the particular vehicle shown in FIG. 1 is sold under the tradename "Jeep". As stated, however, the invention is useful with other vehicles and by way of example, those sold under the tradenames "Bronco", "Toyota", "Scout", and "Landrover" may be considered.

Each such vehicle, denoted in FIG. 1 with the numeral 10, is equipped with four wheels constituting two front wheels and two rear wheels arranged in longitudinally spaced pairs along each side of the vehicle. Each such wheel includes a brake drum 11 to which the tire-equipped wheel component or disc is removably secured by a plurality of angularly spaced lug bolts 12 extending therefrom (FIG. 3), each of which is threaded and adapted to receive a nut 14 thereon. Such arrangements are completely conventional, and such wheel components are not illustrated in the drawings. Associated with each brake drum 11 is a brake apparatus, a considerable part of which is concealed within the interior of the drum and includes the usual bands or discs that are expanded or displaced into frictional engagement with the drum or components thereof, as the case may be, to inhibit and terminate rotation thereof. A fluid system, usually hydraulic, is employed to effect selective energization of the brake apparatuses, and it usually includes a piston-cylinder structure which, for purposes hereof, may be taken to be an integral part of the brake apparatus associated with any brake drum 11 and commonly either is wholly or partly concealed within the interior thereof.

The brake system that includes each drum 11 and brake apparatus associated therewith further includes a plurality of flow conduits and a manually operable motor means for expressing fluid through such conduits to the various brake apparatuses so as to energize the same. In FIG. 5 the two front brake apparatuses (i.e., the piston-cylinder structures thereof) are interconnected by a conduit 16 that is connected through a branch 17 to a motor means 18 equipped with a foot pedal 19 by means of which the brake system is actuated. Similarly, the two rear brake apparatuses are connected by a conduit 20 and branch 21 with the motor means 18. Again, such arrangement is substantially conventional and the motor means 18 takes the form of piston-cylinder structure usually referred to as a master cylinder, and when the pedal 19 is depressed hydraulic fluid is expressed through the branch conduits 17 and 21 to the conduits 16 and 20 to actuate concurrently both the front and rear brake apparatuses. Depending upon the particular vehicle, the motor means 18 and brake pedal 19 may be directly coupled or may be interconnected through a power assist unit. The braking system described is associated with the control system for the vehicle 10 when it is equipped with endless tracks, and such association of the two systems will be described in detail hereinafter.

Such unit or mechanism includes a pair of track assemblies 22 which are respectively disposed along opposite sides of the vehicle 10, as indicated diagrammatically in FIG. 5. The track assemblies 22 may be identical, and are therefore usable on either side of the vehicle 10 simply by turning the assemblies end-for-end and securing the same to the front and rear brake drums 11, as will be described subsequently. Since the track assemblies 22 are identical, one thereof need be considered in detail; and as shown best in FIG. 1 each assembly includes a rigid stabilizer frame 24 having an elongated intermediate portion 25 equipped at the ends thereof with upwardly and outwardly diverging end portions 26 and 27. It will be apparent that the stabilizer frame 24 must be quite strong since the weight of the vehicle 10 is supported therethrough. Typically, the frame 24 will be formed of steel and it may be solid element of generally rectangular configuration in cross section.

The track assembly 22 adjacent the extremities of the front and rear end portions 26 and 27 thereof is equipped with drive sprockets generally denoted with the numerals 28 and 29 that are substantially identical structurally and individually or concurrently operative to drive an endless track 30 entrained thereabout. Intermediate the drive sprockets 28 and 29, and principally oriented along the intermediate section 25 of the stabilizer frame 24, are a plurality of longitudinally spaced idler wheels 31 each of which comprises an outer wheel 32a and an inner wheel 32b respectively disposed on opposite sides of the frame 24 and supported for rotation with respect thereto upon an axle 34 extending through the frame and journalled for rotation therein. The endless track 30 passes over the idlers 31 and is supported thereby along the ground-engaging stretch or segment thereof.

Along its upper stretch or segment, the endless track 30 is engaged by a pair of take-up rollers 35 and 36 that are structurally identical but oppositely oriented, as is evident in FIG. 1. Each take-up roller comprises inner and outer wheels or rollers supported by a transversely disposed axle 37 and rotatable about the axis thereof. The axle 37 is carried at one end of an arm 38 which at the opposite end thereof is pivotally supported by a pin 39 extending between the spaced apart legs of a support bracket 40 welded or otherwise secured to the stabilizer frame 24. A helical tension spring fastened at one end to the stabilizer frame 24 is attached at its other end via a coupling 42 to the bar or arm 38 to bias the same in a direction tending to displace the associated take-up roller upwardly so as to remove any slack in the endless track 30 passing thereover. Thus, in the case of the take-up roller 35, it is biased in a counter-clockwise direction (as viewed in FIG. 1) and the take-up roller 36 is biased in a clockwise direction (as viewed in this same Figure). Since the take-up rollers 35 and 36 are substantially identical, the same numerals are employed to identify the respectively corresponding components associated therewith as, for example, the helical tension springs 41 and bars or arms 38.

The drive sprockets 28 and 29 are substantially identical, as indicated hereinbefore, and the details of the sprocket 28 are most evident in FIGS. 3 and 4. Referring thereto, it will be observed that the drive sprocket 28 includes inner and outer sprocket elements or sprocket wheels 44 and 45 respectively disposed on opposite sides of the stabilizer frame 24. The sprocket elements 44 and 45 are respectively provided with generally planar flanges connecting with hub portions 46 and 47 mounted upon a shaft or axle 48 and keyed or otherwise affixed thereto (as shown at 49 and 50) so as to prevent relative rotation therebetween. Adjustment mechanism is associated with the axle 48 and, in more general terms, with the drive sprocket 28 so as to adjustably determine the axis of rotation thereof. Such adjustment mechanism includes bearing structure 51 mounted within an opening 52 provided therefor in the end portion 26 of the stabilizer 24. The bearing structure 51 is adjustably displaceable angularly within the opening 52, and may be fixedly secured in any position of angular adjustment by conventional means provided for this purpose as, for example, by means of the locking pin or set screw 54 illustrated that extends through the frame and seats within a recess 55 provided for this purpose in the bearing structure 51. It might be observed that there is little tendency for the bearing structure 51 to be displaced from any position of adjustment thereof once the track assembly 22 is properly mounted, as will become more apparent hereinafter.

The axle 48 extends through the bearing structure 51, and is journalled for rotation with respect thereto in a sleeve bearing 56. As is evident in both FIGS. 3 and 4, the axis of rotation of the axle 48 is eccentrically disposed with respect to the center of the opening 52 within which the bearing structure 51 is supported for angular displacements and, therefore, the axis of rotation of the axle 48 is eccentrically located with respect to the axis of rotation of the bearing structure 51. As a consequence, the location of the axle 48 can be shifted longitudinally (i.e., forwardly and rearwardly) relative to the stabilizer frame 24 and relative to the drive sprocket 29 upon angular displacements of the bearing structure 51. For the purpose of facilitating angular adjustment of the bearing structure 51, the opening 52 in which it is supported may be defined by a collar or bearing insert 57 coaxially circumjacent the bearing structure and seated within an opening provided therefor in the stabilizer frame 24.

As previously stated, each of the drive sprockets 28 and 29 are identical structurally so that the sprocket 29 is similarly adjustable with respect to the precise location of the axis of rotation thereof. Such adjustability of the drive sprockets accommodates any disparities or other variations in the distance between the front and rear brake drums 11 and axes of rotation thereof that may occur from vehicle to vehicle even of the same make and model. It will be apparent that any such changes in the relative locations of the axes of rotation of the drive sprockets 28 and 29 will change the amount of slack in the endless track 30, but the take-up rollers 36 and 37 automatically accommodate any such changes.

Each of the track assemblies 22 is secured to the front and rear brake drums 11 on either side of the vehicle 10 by a pair of adapters 58, each of which is of generally cylindrical configuration (as shown most clearly in FIGS. 2 and 3). At one end, the adapter 58 is provided with an inwardly turned flange 59 having a large central opening therethrough so as to receive the outwardly projecting end portion 60 of the associated brake drum 11. The flange 59 is also provided with a plurality of angularly spaced openings respectively alignable with the lug bolts 12 so as to pass the same therethrough, as shown in FIG. 3. Accordingly, the adapter 58 may be firmly secured to the brake drum 11 in the manner of a conventional tire-equipped wheel by means of the lug bolts 12 and nuts 14 cooperative therewith. At its opposite end, each adapter 58 is equipped with an outwardly turned flange 61 having a plurality of angularly spaced openings therethrough respectively alignable with similarly spaced openings provided in the inner sprocket element 48, thereby enabling such sprocket element to be clamped to the adapter 58 by means of a plurality of nut and bolt assemblies 62 passing through such aligned openings.

From the foregoing description of the track assemblies 22, it will be evident that a vehicle 10 ordinarily provided with tire-equipped wheels (not shown) can be converted into a tracked vehicle simply by removing such wheels and by securing adapters 58 to the various brake drums 11. The inner sprocket elements 44 of the front and rear drive sprockets 28 and 29 are then affixed to the adapters 58, whereupon the track assembly 22 is completely attached and is ready for use. In the event that adjustment in the location of the axes of rotation of the drive sprockets 28 and 29 is necessary in order to secure the sprocket elements 44 to the related adapters 58, such adjustment is accomplished as heretofore described simply by angularly adjusting one or the other or both of the bearing structures 51 as may be necessary and then clamping them in their positions of adjustment by the set screws 54. The stabilizer frame 24 fixedly and rigidly relates the front and rear brake drums 11 of the vehicle, and constrains the front wheel assemblies against turning. The endless tracks 30 may be wholly conventional and, in the customary manner, comprise a plurality of individual links pivotally interconnected and preferably provided with outwardly extending lugs adapted to dig into the terrain being traversed by the vehicle.

Since the front wheel assemblies of the vehicle 10 are constrained against turning and therefore are fixed in longitudinal alignment with the rear wheel assemblies, means must be provided for steering or turning the vehicle 10 other than the conventional means embodied in the usual steering column 64. The steering means employed are standard in a functional sense as respects tracked vehicles, and constitutes selective control over the rate at which one endless track 30 moves or travels with respect to the other. In the particular conversion assembly being considered, such differential control is effected by utilizing the brake system of the vehicle and particularly the braking apparatuses thereof respectively associated with the brake drums 11. Such steering system will now be described, and for this purpose particular reference will be made to FIG. 5.

In that the steering system is associated with the braking system of the vehicle, it must be compatible therewith and in the usual instance the systems employed are fluid-utilizing and, in particular, are hydraulic systems. The steering system employed is symmetrical in the sense that it comprises left-hand and right-hand components that are substantially identical and are respectively associated with the front and rear brake assemblies on the left-hand and right-hand sides of the vehicle 10. Thus, the left-hand component of the system includes a motor means 65 adapted to be manually manipulated by a control or lever 66 associated therewith. Usually, the motor means 65 will be a piston-cylinder structure, and it may incorporate or have a reservoir 67 connected therewith. The high-pressure side of the motor means 65 is connected via a conduit 68 and conduit 69 communicating therewith to the front and rear brake apparatuses and, more particularly, to valve assemblies 70 respectively associated therewith. In a completely analogous arrangement, the right-hand component of the steering system includes a motor means 71 having a control lever 72 and reservoir 73 associated therewith, and which motor means is connected via conduits 74 and 75 with the front and rear brake apparatuses on the right-hand side of the vehicle 10. Again, valve assemblies are employed in association with such brake apparatuses and, since they are the same as the valve assemblies used on the left-hand side of the vehicle, the same numeral 70 is employed to identify the same.

The valve mechanisms 70 are conventional components known in the art as shuttle valves, and in their present use function automatically to isolate automatically one of the systems from the other in accordance with which is being used at any particular instant. Shuttle valves of the type being considered include check valve functions as an integral part thereof, but for descriptive purposes and convenience of understanding each valve mechanism 70 is depicted as having separate check valves 76 and 77 associated therewith. The interconnection of the steering and braking systems (as shown in FIG. 5, including the valve mechanisms 70) enables the vehicle 10 to be permanently equipped with each such system so that conversion of the vehicle from a wheeled to a tracked vehicle requires nothing more than interchange of the tire-equipped wheels with the track assemblies 22.

In use of the vehicle 10, the regular braking system thereof may be used in a conventional manner simply by depressing the pedal 19, whereupon the hydraulic fluid then expressed through the conduits 16 and 20 causes each of the valve mechanisms 70 to actuate the check valves 77 thereof so that the steering system is isolated from the braking system and to deactuate the check valves 66 so that the hydraulic fluid being delivered to the brake apparatuses to energize the same may be relieved therefrom when the brake pedal 19 is released. Upon conversion to a tracked vehicle, steering is accomplished by differentially controlling the velocites of the two endless tracks 30 through appropriate manipulation of the respective motor means 65 and 71 associated therewith.

For example, if it is desired to turn the vehicle to the right, the lever 72 is manually displaced so as to energize the motor means 71, whereupon fluid is expressed to the brake apparatuses associated with the front and rear brake drums 11 of the right-hand side of the vehicle. As a consequence, a frictional inhibition to rotation of the drums 11 is effected, whereupon the velocity of the associated track 30 is decreased with the result that the higher velocity of the left-hand track 30 tends to turn the vehicle toward the right. The sharpness of the turn evidently depends upon the extent to which the motor means 71 is energized in the case of a turn toward the right, and extent to which the motor means 65 is energized in the event of the vehicle being turned to the left. As in the case of the regular braking system being used, whenever the steering system is employed the valve mechanism 70 functions to deactuate or make ineffective the check valves 77 so that fluid can flow in either direction through the conduits 69 or 75, and to actuate the check valves 76 so as to prevent interference with the regular braking system.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A mechanism for converting a wheel-equipped vehicle into a tracked vehicle, including a pair of adapters for respective connection with the front and rear brake drums of such vehicle on one side thereof so that at least one such adapter is a driven component, a rigid stabilizer frame having a fixed length, rotatable drive sprockets carried on said frame adjacent the front and rear ends thereof, a plurality of rotatable idler wheels carried on said frame intermediate said sprockets, an endless ground-traversing track entrained about said sprockets and idler wheels, said drive sprockets being respectively connected to said adapters so that at least one such sprocket is driven by its associated adapter to impart motive power to said track for propelling such vehicle, and a rotary adjustment mechanism provided adjacent one end of said stabilizer frame operatively connected to one of said drive sprockets to enable the location of the axis of rotation of said one drive sprocket to be selectively adjusted with respect to the location of the axis of rotation of the other of said drive sprockets.

2. The mechanism of claim 1 in which said adjustment mechanism includes an opening provided by said stabilizer frame at one end thereof and bearing structure provided by the aforesaid one drive sprocket and being mounted within said opening and adjustably displaceable angularly with respect thereto, said bearing structure defining an eccentrically oriented axis of rotation for said one drive sprocket so that adjustable displacement of said bearing structure within said opening changes the spacing between the axes of rotation of said drive sprockets.

3. The mechanism of claim 2 in which each of said adapters is generally cylindrical and is provided with laterally extending flanges at the ends thereof, one of said flanges being provided with angularly spaced apertures adapted to receive the lug bolts of such brake drum to effect connection therewith and the other being connectable with the associated drive sprocket.

4. The mechanism of claim 1 and further including a spring biased take-up roller supported by said stabilizer frame and engageable with said track so as to accommodate automatically any change in the tautness of said track occasioned by change in the relative locations of the axes of rotation of said drive sprockets.

5. The mechanism of claim 1 in which said stabilizer frame is provided with an elongated intermediate portion and upwardly and outwardly diverging front and rear ends extending therefrom, said idler wheels being mounted in spaced apart relation along said intermediate portion to support the ground-engaging stretch of said track, and said drive sprockets being located adjacent the outer extremities of said diverging front and rear ends, said stabilizer frame being effective to fixedly relate the front and rear wheels of such vehicle along one side thereof and thereby constrain turning displacement of such front wheel.

6. The mechanism of claim 5 in which adjustment mechanism is provided adjacent one end of said stabilizer frame in association with said drive sprocket thereat to enable the location of the axis of rotation thereof to be selectively adjusted with respect to the location of the axis of rotation of the other of said drive sprockets, and further including a spring biased take-up roller supported by said stabilizer frame and engageable with said track so as to accommodate automatically any change in the tautness of said track occasioned by change in the relative locations of the axes of rotation of said drive sprockets.

7. The mechanism of claim 6 in which said adjustment mechanism includes an opening provided by said stabilizer frame at one end thereof and bearing structure provided by the aforesaid associated drive sprocket and being mounted within said opening and adjustably displaceable angularly with respect thereto, said bearing structure defining an eccentrically oriented axis of rotation for the associated drive sprocket so that adjustable displacement of said bearing structure within said opening changes the spacing between the axes of rotation of said drive sprockets.

* * * * *